United States Patent [19]

Habermann et al.

[11] Patent Number: 5,169,538
[45] Date of Patent: Dec. 8, 1992

[54] REMOVAL OF NOBLER METAL IONS THAN IRON FROM PROCESS AND WASTE WATERS

[75] Inventors: Wolfgag Habermann, Mainz; Armin Haag, Hirschberg; Wolfgang Kochanek, Neustadt, all of Fed. Rep. of Germany

[73] Assignee: Basf Aktiengesellschaft, Ludwigshafen, Fed. Rep. of Germany

[21] Appl. No.: 819,730

[22] Filed: Jan. 13, 1992

[30] Foreign Application Priority Data

Jan. 12, 1991 [DE] Fed. Rep. of Germany ....... 4100741

[51] Int. Cl.⁵ .................................................. C02F 1/62
[52] U.S. Cl. .................................... 210/709; 210/719; 210/724; 210/912
[58] Field of Search ............... 210/719, 709, 724, 746, 210/757, 912

[56] References Cited

U.S. PATENT DOCUMENTS

| | | | |
|---|---|---|---|
| 3,755,161 | 8/1973 | Yokata et al. | 210/912 |
| 4,740,244 | 4/1988 | Williams | 210/719 |
| 4,806,264 | 2/1989 | Murphy | 210/719 |
| 4,874,530 | 10/1989 | Kobayashi et al. | 210/719 |
| 4,956,097 | 9/1990 | Courduvelis | 210/719 |
| 5,085,836 | 2/1992 | Booker | 210/719 |

Primary Examiner—Thomas Wyse
Attorney, Agent, or Firm—Keil & Weinkauf

[57] ABSTRACT

The application relates to a process for removing nobler metal ions than iron, especially copper ions, from acidic process and waste waters by reduction under an inert gas atmosphere with carbonyl iron powders which have previously been subjected to a thermal treatment with hydrogen to remove nitrides and carbides. This process results in residual metal ion content <0.5 ppm and thus complete removal of the metal ions to be reduced.

11 Claims, No Drawings

REMOVAL OF NOBLER METAL IONS THAN IRON FROM PROCESS AND WASTE WATERS

The present invention relates to a process for removing nobler metal ions than iron, especially copper, from acidic process and waste waters by reduction with iron powders.

The process used industrially to recover copper from acidic waste waters is the reduction of copper ions with metallic iron. The process is based on the reaction of copper ions with iron in accordance with the equation $$Cu^{++} + Fe^\circ \rightarrow Cu^\circ + Fe^{++}$$

resulting in iron ions entering the waste water in place of copper ions. A side reaction is the formation of hydrogen $$2H_3O^+ + Fe^\circ \rightarrow Fe^{++} + H_2 + 2H_2O$$

The iron used for the reduction is a material with a large surface area, e.g. in the form of powders, fine granules, turnings or sponge. Problems arise in the reduction owing to the facts that it is not possible to deposit the copper in a form which is resistant to abrasion and dimensionally stable on the iron because there is formation of finely divided copper sponge or of copper containing copper(I) oxide, the amount of iron consumed is a multiple of that required by the stoichiometry, so that further pollution of the waste water may arise and the resultant copper is finely divided and, in some cases, colloidal or bound in a complex and often cannot be removed by filtration.

An additional factor is that the use of the iron available industrially results in the off-gas containing not only hydrogen but also hydrogen sulfide and phosphine. Both the latter represent a considerable environmental hazard.

The difficult removal of copper in these processes must take place under nitrogen to avoid reduced copper redissolving in the presence of oxygen and absence of metallic iron.

Despite these precautions, it is not possible in this way to reduce the metal content in the waste water below 1 ppm because the formation of colloidal metals makes quantitative removal impossible.

It is an object of the present invention to reduce metal ions with iron powders in such a way that the reduction does not result in any finely divided colloidal metal powders, and thus the residual content of the metal ions to be reduced in the waste water is reduced to $\leq 1$ ppm.

We have found that this object is achieved by carrying out the reduction with carbonyl iron powders which contain not less than 99% by weight of iron in the presence of an inert gas, eg. nitrogen, which avoids the disadvantages of the previous processes.

For the reduction to go to completion it is crucial that the carbonyl iron powders which are employed are, before the cementation, subjected to a thermal treatment with hydrogen for substantial removal of carbides and nitrides, because these favor the formation of finely divided and colloidal metals in the reaction, in the presence of oxygen catalytically increase the rate of oxidation of the metals which have been reduced and increase the formation of soluble metal complexes in the boundary layers owing to formation of ammonia.

The iron used for reducing the metal ions must therefore meet the following content requirements iron: $\geq 99.5\%$ by weight
carbon: $\leq 0.05\%$ by weight
nitrogen: $\leq 0.01\%$ by weight
sulfur: $\leq 0.0001\%$ by weight
phosphorus: $\leq 0.0001\%$ by weight
other metals: 0.001% by weight The preferred iron powders which meet these quality requirements are carbonyl iron powders which have been thermally purified in a stream of hydrogen at from 350° C. to 450° C. for about 12–24 h.

The particle size of the iron powder can be from 0.5 to 1000 $\mu$m. A carbonyl iron powder with a particle size of from 20 to 150 $\mu$m is preferably employed because when finely divided iron powders are used the metal deposits may be finely divided and when excessively coarse metal powders are used the time needed for the reaction is considerably increased.

The pH during the reduction ought to be $\leq 4$, preferably from 0 to 2. The temperature during the reduction with iron powders can be from $+10°$ C. to $+100°$ C. A temperature range from $+50°$ C. to $+80°$ C. has proven beneficial. To establish the endpoint of the reduction, the potential of the reduced metal ions is measured using a redox electrode with a reference electrode. Platinum, platinum group or gold electrodes are used as redox electrodes, and silver/silver chloride, Thalamid or calomel electrodes are used as reference electrodes. The potential at the end of the reduction ought to be more negative than the redox potential of the metal to be deposited. This condition is achieved by employing a stoichiometric excess of iron. In the absence of oxygen and with an excess of iron the reduction results in surface loading of the reduced metal with hydrogen, which lowers the potential of the reduced metal into the region of the pH-dependent hydrogen potential. In addition, the potential can, if necessary, be lowered by residual iron contained in the reduced metal precipitate or by adding small amounts ($\leq 10\%$ of the stoichiometric amount of iron required) of aluminum or magnesium powder. Besides these methods, it is possible to use cathodic polarization to lower the potential of the reduced metal precipitate. In this case, an inert cathode of, for example, copper, nickel or a stainless steel is inserted into the reaction vessel and is polarized with respect to a titanium anode which is coated with a platinum metal and is separated by a diaphragm or a cation exchanger membrane.

In the case of copper reduction in the absence of chloride, the equation $$Cu^{++} + 2e \rightarrow Cu^\circ$$

$$E^\circ = +0.345 \text{ V}$$

shows that a potential $< +0.34$ V must be maintained, whereas in the presence of chloride the equation $$CuCl_2^- + e \rightarrow Cu^\circ + 2Cl^-$$

$$E^\circ = +0.19 \text{ V}$$

shows that a potential < +0.19 V is necessary.

The excess of iron in the reduction of metal ions can be from 1.001:1 to 10:1 based on the amount required by the stoichiometry. An excess of iron of from 1.1:1 to 1.5:1 is preferably used because a larger excess does not essentially improve the reduction.

Deposition of metal ions by reduction with carbonyl iron powders can be carried out industrially in stirred vessels. Suitable and preferred stirrers are impellers or propellers. The stirred vessel can be operated continuously or batchwise. In place of the stirred vessel it is also possible to use for continuous operation a mixing system, a moving bed or fluidized bed or tubular reactor.

The reduced metal can be removed by gravity separation, e.g. in a settling tank or with the aid of a filtration system, e.g. a filter press or a suction filter.

The reduced metal precipitate is removed under an inert gas atmosphere, e.g. nitrogen, at potentials which are more negative than the redox potential of the metal to be deposited. The potential of the metal precipitate can be adjusted by an excess of iron, by cathodic polarization or by adding reducing agents such as $SO_2$, Al or Mg.

EXAMPLE 1

100 l of an acidic waste water which contains 23% by weight sulfuric acid, 3.5% by weight hydrochloric acid, about 0.8% by weight dissolved organic compounds and 2450 ppm copper are introduced into a vessel with a propeller stirrer. The waste water is heated to 65° C. under a nitrogen atmosphere and, while stirring, 325 g of carbonyl iron powder with the composition 99.5% by weight iron, <0.01% by weight carbon, <0.01% by weight nitrogen, 0.0001% by weight sulfur, <0.0001% by weight phosphorus and <0.0001% by weight other metals are added. This carbonyl iron powder had been treated with hydrogen at 380° C. for 24 h to remove carbides and nitrides. The excess of iron is 1.5:1 based on the theoretical amount required. The particle size of the carbonyl iron powder is 30-150 lm. Under these experimental conditions and with a stirring speed of 500 rpm, the results are as follows:

| Holdup time [min] | Copper deposition [%] | Residual copper ion concentration [ppm] |
|---|---|---|
| 0 | 0 | 2450 |
| 5 | −99.7 | −8 |
| 10 | −99.9 | −1 |
| 15 | −100 | 0.5 |
| 60 | −100 | 0.5 |

The resulting spongy copper metal can be removed completely by sedimentation or through a suction filter.

The results when a carbonyl iron powder which has the composition 97.8% by weight iron, −1.0% by weight nitrogen and −1% by weight carbon and which has not been pretreated with hydrogen is used under experimental conditions which are otherwise identical are as follows:

| Holdup time [min] | Copper deposition [%] | Residual copper ion concentration [ppm] |
|---|---|---|
| 0 | 0 | 2450 |
| 5 | 95.5 | 110 |
| 10 | −98.0 | 47 |
| 20 | −99.5 | 13 |
| 60 | −99.5 | 12 |

The reduced copper is very finely divided so that it is necessary to use diatomaceous earth to aid filtration.

The results when the reduction is carried out not under an inert gas atmosphere but in the presence of air under conditions which are otherwise identical with the iron powders untreated or treated with hydrogen are as follows:

| Type of iron powder | Holdup time [min] | Copper deposition [%] | Residual copper concentration [ppm] |
|---|---|---|---|
| H$_2$-treated | 0 | 0 | 2450 |
| H$_2$-treated | 10 | 99.9 | −2 |
| H$_2$-treated | 30 | 99.9 | −1 |
| H$_2$-treated | 60 | 98.2 | 45 |
| Untreated | 0 | 0 | 2450 |
| Untreated | 10 | 94.1 | 145 |
| Untreated | 30 | 96.7 | 80 |
| Untreated | 60 | 87.6 | 305 |

EXAMPLE 2

100 l of an acidic waste water which contains about 15% by weight hydrochloric acid, 4.5% by weight sulfuric acid and 2100 ppm copper are introduced into a stirred vessel as in Example 1. A 1.5-fold excess of carbonyl iron, based on the amount theoretically required, is added to the waste water at 65° C., and the copper ions are reduced under a nitrogen atmosphere. The carbonyl iron powder was treated with hydrogen as in Example 1 and had the same composition and particle size. The results of the reduction are shown in the Table which follows:

| Holdup time [min] | Copper deposition [%] | Residual copper ion concentration [ppm] |
|---|---|---|
| 0 | 0 | 2100 |
| 10 | −99.9 | −1 |
| 30 | −100 | −0.5 |
| 60 | −100 | ≦0.5 |
| 90 | −100 | ≦0.5 |

The resulting spongy copper can be removed completely by sedimentation or through a filter press.

EXAMPLE 3

100 l of an acidic waste water which contains about 7.2% by weight sulfuric acid and 130 ppm silver ions are introduced into a stirred vessel as in Example 1. A 1.3-fold excess of a carbonyl iron powder reduced in a hydrogen atmosphere is added to the waste water at 65° C. The reduction is carried out under nitrogen. The carbonyl iron powder has the same composition and particle size as the reduced powder in Example 1. The following results are obtained:

| Holdup time [min] | Silver deposition [%] | Residual silver concentration [ppm] |
| --- | --- | --- |
| 0 | 0 | 130 |
| 10 | −100 | <1 |
| 30 | −100 | <0.5 |

The resulting spongy silver can be completely removed through a suction filter.

We claim:

1. A process for removing copper and/or silver ions from acidic process and waste waters by reduction with iron powders, which comprises: contacting the copper and/or silver ions with iron carbonyl powder which contains not less than 99% by weight of iron in the presence of an inert gas.

2. A process as defined in claim 1, wherein the iron carbonyl powder is, before the reduction, subjected to a thermal treatment with hydrogen to remove carbides and nitrides.

3. A process as defined in claim 1, wherein the particle size of the iron carbonyl powder is from 0.5 to 1000 μm.

4. A process as defined in claim 1, wherein the reduction is carried out at $pH \leqq 4$.

5. A process as defined in claim 1, wherein the reduction is carried out at from $+10°$ C. to $+100°$ C.

6. A process as defined in claim 1, wherein the metering of the iron carbonyl is controlled by redox potential measurement in such a way that the potential during and at the end of the reaction is more negative than the redox potential of the metal being deposited in the relevant process or waste water.

7. A process as defined in claim 1, wherein the ratio of metal in the waste water to the iron carbonyl powder is from 1:1.001 to 1:10.

8. A process as defined in claim 1, wherein the particle size of the iron carbonyl powder is from 20 to 150 μm.

9. A process as defined in claim 1, wherein the reaction is carried out at a pH of from 0 to 2.

10. A process as defined in claim 1, wherein the reaction is carried out at from $+50°$ to $+80°$ C.

11. A process as defined in claim 1, wherein the ratio of metal in the waste water to the iron carbonyl powder is from 1:1.1 to 1.5.

* * * * *

UNITED STATES PATENT AND TRADEMARK OFFICE
CERTIFICATE OF CORRECTION

PATENT NO. : 5,169,538

DATED : December 8, 1992

INVENTOR(S) : HABERMANN et al.

It is certified that error appears in the above-identified patent and that said Letters Patent is hereby corrected as shown below:   On the title page: Item[75]

under Inventors: "Wolfgag" should read -- Wolfgang --

Signed and Sealed this

Twenty-sixth Day of October, 1993

Attest:

BRUCE LEHMAN

*Attesting Officer*      *Commissioner of Patents and Trademarks*